United States Patent [19]

Doane et al.

[11] Patent Number: 4,814,994

[45] Date of Patent: Mar. 21, 1989

[54] RELATIVE POSITION NAVIGATION SYSTEM WITH MEANS FOR COMPUTING SYNTHETIC AZIMUTH

[75] Inventors: James R. Doane, Grand Island; Joan M. Sulecki, Snyder, both of N.Y.

[73] Assignee: LTV Aerospace and Defense Company, Buffalo, N.Y.

[21] Appl. No.: 928,022

[22] Filed: Nov. 7, 1986

[51] Int. Cl.[4] .................. G01S 1/16; G06G 15/48
[52] U.S. Cl. ..................... 364/460; 342/29; 364/461
[58] Field of Search ............. 364/460, 461, 462; 342/29, 30

[56] References Cited

U.S. PATENT DOCUMENTS

| | | | |
|---|---|---|---|
| 3,400,399 | 9/1968 | Kline | 364/462 |
| 3,469,079 | 9/1969 | Stansbury | 364/461 |
| 3,582,626 | 6/1971 | Stansbury | 364/461 |
| 3,714,648 | 1/1973 | Bennett et al. | 342/29 |
| 4,016,564 | 4/1977 | Ross | 342/30 |
| 4,167,006 | 9/1979 | Funatsu et al. | 364/461 X |
| 4,188,630 | 2/1980 | Milosevic | 342/29 |
| 4,380,050 | 4/1983 | Tanner | 354/461 |

Primary Examiner—Felix D. Gruber
Assistant Examiner—Thomas G. Black
Attorney, Agent, or Firm—Brooks & Kushman

[57] ABSTRACT

A relative position navigation system and method installed in a first participant for computing the relative position, in range and azimuth, of at least one other participant in the system without using azimuth-sensing apparatus. The system includes ranging apparatus for determining the distance between the first participant and the other selected participant for at least three selected points in time. A processor determines the change in position of the first participant relative to the second participant during the time periods between the first and second, and second and third points in time, and computes the "synthetic" (rather than measured) azimuth coordinate of the selected other participant relative to the first participant at the third point in time as a function of the distance and change in relative position data obtained by the system. The method includes the steps of determining the distance between the two participants at three times, determining the change in position of the first participant relative to the second over the resulting two time intervals and computing the non-ambiguous solution for the relative position as a function of the distances and changes in relative position.

11 Claims, 2 Drawing Sheets

RELATIVE POSITION NAVIGATION SYSTEM WITH MEANS FOR COMPUTING SYNTHETIC AZIMUTH

FIELD OF THE INVENTION

The present invention relates generally to navigation systems and more particularly to a relative position air navigation system having two or more participants and including means for cumputing the azimuth between any two participants.

BACKGROUND OF THE INVENTION

Various navigation systems are currently employed by aircraft for the purpose of ascertaining the position of the aircraft, or of other aircraft of landmarks relative to the aircraft. These systems typically produce two numbers to fix a participant's geodetic location on the ground plane—north and east, or range and bearing (azimuth). Systems such as TACAN, and Inertial Navigation System (INS), and Trade Air Speed (TAS)-/Compass Systems are currently available and provide geodetic data in one or both of the above coordinate systems from which the relative position of two participants can be determined. However, the position data which can be shared by these systems is not accurate enough for relative navigation. For example, the INS error is measured in miles.

Furthermore, existing on-board relative navigation systems require more than two participants or necessitate the use of an angle-sensor to obtain bearing information, or both.

It is therefore one object of the present invention to provide an on-board relative navigation system which can be used in connection with the existing INS, Doppler, or TAS velocity sensors to provide accurate relative position data between two or more participants with increased precision.

It is another object of the present invention to provide a relative navigation system which provides range and azimuth coordinates without the use of an angle-sensor.

It is yet another object of the present invention to provide a navigation system which automatically computes the azimuth coordinate of the relative position between two participants from range and velocity information shared by those participants.

SUMMARY OF THE INVENTION

According to the present invention, a relative position navigation system installed in a first participant for computing the relative position, in range and azimuth, of at least one other participant in the system, includes range means for determining the distance between the first participant and the other selected participant at at least three different times, processor means for determining the change in position of the first participant relative to the second participant at the second and third selected times, processor means for calculating the azimuth coordinate of the other participant relative to the first participant based upon this change-in-relative-position and distance information and processor means for calculating the confidence level (covariance) of the azimuth.

The first function of the processor means preferably includes a data link between the first participant and the other selected participant for exchanging position data including the current velocity vectors of the participants, velocity vector computation means for determining the relative velocity vector between the first and other selected participants at a selected time, and storage means for storing the distance and relative velocity vectors between the first and other selected participants for each of at least three points in time.

The second function of the processor means preferably utilizes only relative velocity and distance information in its calculations, thereby obviating the need for more expensive equipment, such as an angle-sensor, on board the participants. This computation means performs a synthetic azimuth algorithm which relies on a simple set of equations to determine the set of possible solutions—including the true position and a false solution—for the position of the other selected participant relative to the first participant at any point in time. These equations require only range and relative velocity data for three or more selected points in time, during which time the movement of the first participant relative to the selected other participant has changed in direction by at least a minimal angle. By solving these equations, the single common solution to the equations—the true position of the other selected participant—can be determined.

Data are transferred between participants using a data link. The data link may be any known communicating means, such as the well-known L-Band radio frequency communication employed for this purpose in the preferred embodiment of the system. The data provided by the selected other participant to the first participant include the instantaneous velocity vector of that participant, and preferably also include altitude information so that the problem is reduced to two dimensions. The velocity information is obtained by each participant from existing navigation systems, such as an Inertial Navigation System (INS), a Doppler radar, or a True Air Speed (TAS)/Compass System, and transferred via the data link to the other participants.

From the velocity information supplied by the participants, the system computes the relative velocity vector between the first and selected other participant at any point in time at which a range measurement was made. The line integral of this relative velocity vector over the interval from the previous point in time at which a range reading was taken to the time at which the velocity vector was computed represents the change in position of the first participant relative to the selected other participant over that time interval. Thus, the change in relative position of the first participant with respect to the other selected participant between those points in time and the range (representing the distance from the first participant to the selected other participant) for each of those points in time is known for any selected three points in time.

The set of solutions for the possible position of the selected other participant at each point in time is geometrically represented by a circle having a radius equal to the distance between the participants, with the first participant being located in the center of the circle. If the three circles which represent the three sets of solutions at three selected points in time are plotted with the centers displaced from each other in proportion to the relative change of position of the two participants at each point in time, the points of intersection of the circles represent generally two types of solutions—(1) the true position of the selected other participant relative to the first participant, and (2) a false position.

If at least one participant changes the direction of its movement relative to the other participant during one of the time intervals, all three circles representing the potential solutions will intersect at only one point—the true position. The second function of the processor means utilizes an algorithm, in mathematical equation form, to determine the true position and, thus, the azimuth of a selected other participant with a high degree of accuracy at any selected point in time.

Thus, the system and method of the present invention allow for nearly instantaneous on-board computation of range and azimuth position data for one or more selected participants relative to the first participant, without the need for additional angle sensing equipment. Also, the azimuth computation, and thus the relative position coordinates, are significantly more accurate than a relative position computed by differencing geodetic position data obtainable with the use of currently available navigation systems.

The preferred embodiment of the invention also includes a third function of the processor means for determining the covariance, or confidence measure, of the result obtained. If there is little relative velocity or the input data are very noisy or otherwise degraded, the synthetic azimuth estimate may not be as good as desired. The use to which the synthetic azimuth estimate is put varies depending on the covariance value. For example, when the covariance indicates that the estimate is good, only a few (e.g. two or three) estimates are combined to produce the final position result. On the other hand, if the estimate is bad, many estimates (e.g. 15 or 16) are combined to produce the final position information.

The final position information may be presented in any number of ways, for example, as a numerical read out. In the preferred embodiment, the result is displayed graphically on a display screen to permit rapid assimilation of the information.

DETAILED DESCRIPTION OF THE INVENTION

The specification uses the term "wingman" in the singular to refer to one participant whose location is being determined. It is understood, however, that, under normal conditions, the system will be determining the locations of a number of participants by performing the same operations described below for each participant. Because the calculations are performed rapidly by computer, the operations appear to be performed simultaneously.

In addition, for the sake of clarity, the term "lead" will be used to refer to the participant taking the readings, receiving shared data and locating other participants. Either one of the participants, however, may be a stationary ground participant since the disclosed system and method require only relative motion.

Figure 1:
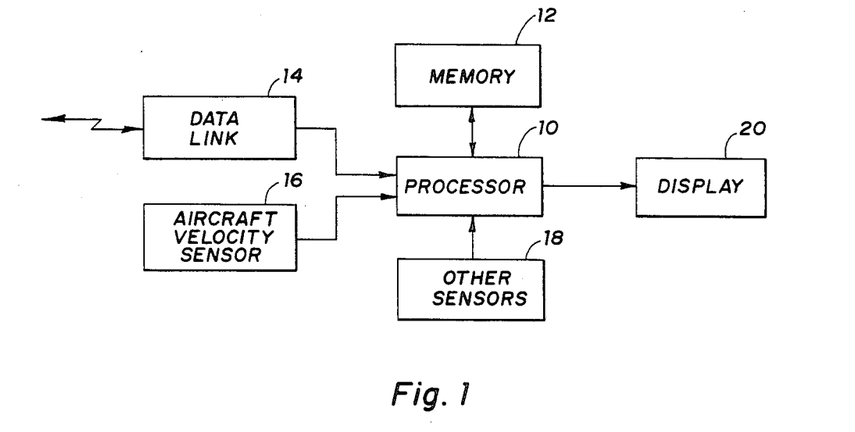
FIG. 1 is a block diagram of the invention.

FIG. 1 illustrates, in block diagram form, the preferred embodiment of the system of the present invention. The system is centered around a central processing unit 10 which has associated memory 12. The processor received input from a data link 14, an on-board aircraft velocity sensor 16 and other on-board sensors 18 such as a baroaltimeter. Although the present invention is designed to be used by moving aircraft, it is adaptable for use by a ground station by fixing the velocity sensor input 16 at zero. The processor displays the results of its analysis graphically on a display 20 visible to the navigator. The display may be any known and commonly available display device, such as a Radar Electro-Optical display.

The details of the data link 14, the sensors 16 and 18, and the signals necessary to drive the display 20 are well known and will not be described in detail here. For the purposes of this disclosure, it is necessary only to understand that the data link 14 receives velocity-relative-to-ground information from, and determines distance (range) to, the selected wingman (whether a moving aircraft or a fixed ground station). The velocity information is readily available using devices commonly installed on aircraft, for example an INS.

Range may be determined by any of a number of conventional techniques. In the preferred embodiment, a predetermined coded signal is sent by the lead on the base frequency and received by the wingman. After a fixed time delay the wingman re-transmits the coded signal to the lead. Upon receipt, the lead is able to determine the range of the wingman as a function of the time delay between the lead's transmission and receipt of the coded signal.

Figure 2:
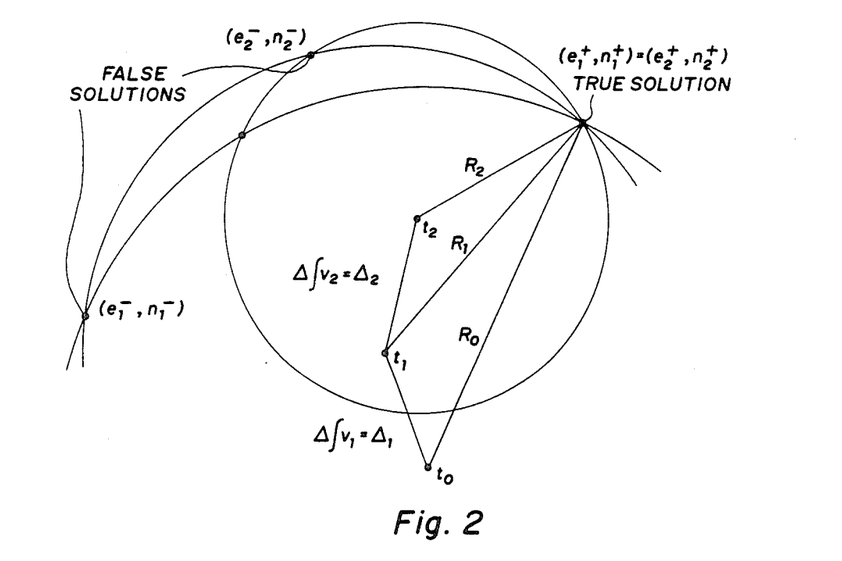
FIG. 2 illustrates graphically the operation of the invention.

By way of example, the operation of the invention will be described with reference to FIG. 2. FIG. 2 illustrates graphically the information aquired by the lead and the results of computations performed on the data.

At time $t_0$, the lead receives data giving the range $R_0$ of the wingman and its current velocity vector (speed and direction) relative to ground, $V_0$. The value $R_0$ can be viewed as the radius of a circle relative to the lead on which the wingman is somewhere located. At tine $t_1$, the lead again acquires information comprising range $R_1$ and velocity $V_1$. The range $R_1$ defines a second circle relative to the lead. The second circle is offset in space from the first by the change in relative position (integrated relative velocity vector) between the lead and the wingman between times $t_0$ and $t_1$. The relative change is also called the apparent integrated velocity vector (delta).

The intersection of the two circles defines two points, designated $(e_1-, c_1-)$ and $(e_1+, n_1+)$. One of these points is the true relative location of the wingman. The other is a false solution. Any algorithm that computes two-dimensional positions (range and azimuth) from one-dimensional data (ranges) gives rise to two ambiguous solutions at a single point in time (e.g., $t_1$). One will be correct and one will be false.

The ambiguity can be eliminated by taking a third reading at time $t_2$ with a different relative directional heading, preferably at least on the order of one degree. To obtain a different directional heading, either the lead or the wingman must change direction relative to the other. After taking the third reading, two new points $(e_2+, n_2+)$ and $(e_2-, n_2-)$ can be computed as the intersection of the second and third circles. If there was a change in relative direction, one of the two new points will always be different from both of the original points and under ideal conditions, the other of the new points will be the same as one of the original points. The point where three circles intersect resolves the ambiguity and establishes the true relative position of the wingman. Although the algorithm is titled "Synthetic Azimuth"

the (range, azimuth) coordinate system is typically not the most convenient choice for computation, thus the true and false solutions are computed as $(e_n+, n_n+)$ and $(e_n-, n_n-)$. In (range, azimuth) coordinates, the solutions are $(R_n, \tan^{-1}(e_n+/n_n+))$ and $(R_n, \tan^{-1}(e_n-/n_n-))$.

The points $(e+, n+)$ and $(e-, n-)$ are computed using the following formula $$e^+{}_n = u^+ \cos\psi + v \sin\psi$$

$$ee^-{}_n = u^- \cos\psi + v \sin\psi$$

$$n^+{}_n = -u^+ \sin\psi + v \cos\psi$$

$$N^-{}_n = -h^- \sin\psi + v \cos\psi$$

Psi is the angle clockwise from true north of the vector change in relative position over the time interval $t_{n-1}$ to $t_n$. The vector change in relative position is the integral from $t_{n-1}$ to $t_n$ of the relative velocity vector.

u+, u− and v are computed from the range information and change in integrated relative velocity (Delta) between two readings:

$$v = \frac{R_0^2 - R_1^2 - \Delta^2}{2\Delta}$$

$$u^+ = \sqrt{R_1^2 - v^2}$$

$$u^- = -\sqrt{R_1^2 - v^2}$$

Points $(e_1+, n_1+)$ and $(e_1-, n_1-)$ represent the true and false positions of the other participant relative to the first participant at time $t_n$ in an east-north coordinate system, the true position being either the "+" or the "−" solution, depending on the relative geometry of the participants. Points $(u_n+, v_n+)$ and $(u_n-, v_n-)$ represent the same two positions in a coordinate system defined by the v-axis being rotated by "psi" clockwise from the north. $R_0$ and $R_1$ represent the ranges between the first and second participants at times $t_{n-1}$ and $t_n$.

Delta is the magnitude of the vector change in relative position over the time interval $t_{n-1}$ to $t_n$. that is, $\sqrt{(\int V_e)^2 + (\int V_n)^2}$ Although, under ideal conditions, only three readings need be taken to determine the true location of the wingman, noise and minor variations in data values make this difficult in practice. Consequently, in practice, a number of readings are taken before a position estimate is displayed to the navigator. The number of readings taken depends on the reliability of the data as determined using a covariance analysis. When the data are found to be reliable, only a few readings need be taken to pinpoint the wingman's relative location. When the data are less reliable, more readings are taken.

The covariance is computed as a matrix of variance and covariance values:

$$cov = \begin{bmatrix} \sigma_{ee}^2 & \sigma_{en}^2 \\ \sigma_{ne}^2 & \sigma_{nn}^2 \end{bmatrix}$$

The covariance values are computed as follows:

$$\sigma_{EE}^2 = \frac{\partial E^2}{\partial R0} \sigma_{R0}^2 + \frac{\partial E^2}{\partial R1} \sigma_{R1}^2 + \frac{\partial E^2}{\partial \Delta} \sigma_\Delta^2 + \frac{\partial E^2}{\partial \psi} \sigma_\psi^2$$

$$\sigma_{NN}^2 = \frac{\partial N^2}{\partial R0} \sigma_{R0}^2 + \frac{\partial N^2}{\partial R1} \sigma_{R1}^2 + \frac{\partial N^2}{\partial \Delta} \sigma_\Delta^2 + \frac{\partial N^2}{\partial \psi} \sigma_\psi^2$$

$$\sigma_{EN}^2 = \frac{\partial E}{\partial R0} \frac{\partial N}{\partial R0} \sigma_{R0}^2 + \frac{\partial E}{\partial R1} \frac{\partial N}{\partial R1} \sigma_{R1}^2 +$$

$$\frac{\partial E}{\partial \Delta} \frac{\partial N}{\partial \Delta} \sigma_\Delta^2 + \frac{\partial E}{\partial \psi} \frac{\partial N}{\partial \psi} \sigma_\psi^2$$

$$\sigma_{NE}^2 = \sigma_{EN}^2$$

where: $\sigma_{R\phi}^2$, $\sigma_{R1}^2$, $\sigma_\Delta^2$, $\sigma_\psi^2$, are variances (standard statistical characteristics) of the measurement errors associated with the range system and navigation sensors and include those associated with, and already "known" by, the lead apparatus and those associated with, and "known" by, the wingman aparatus, and which are telemetered to the lead apparatus.

Figure 3:
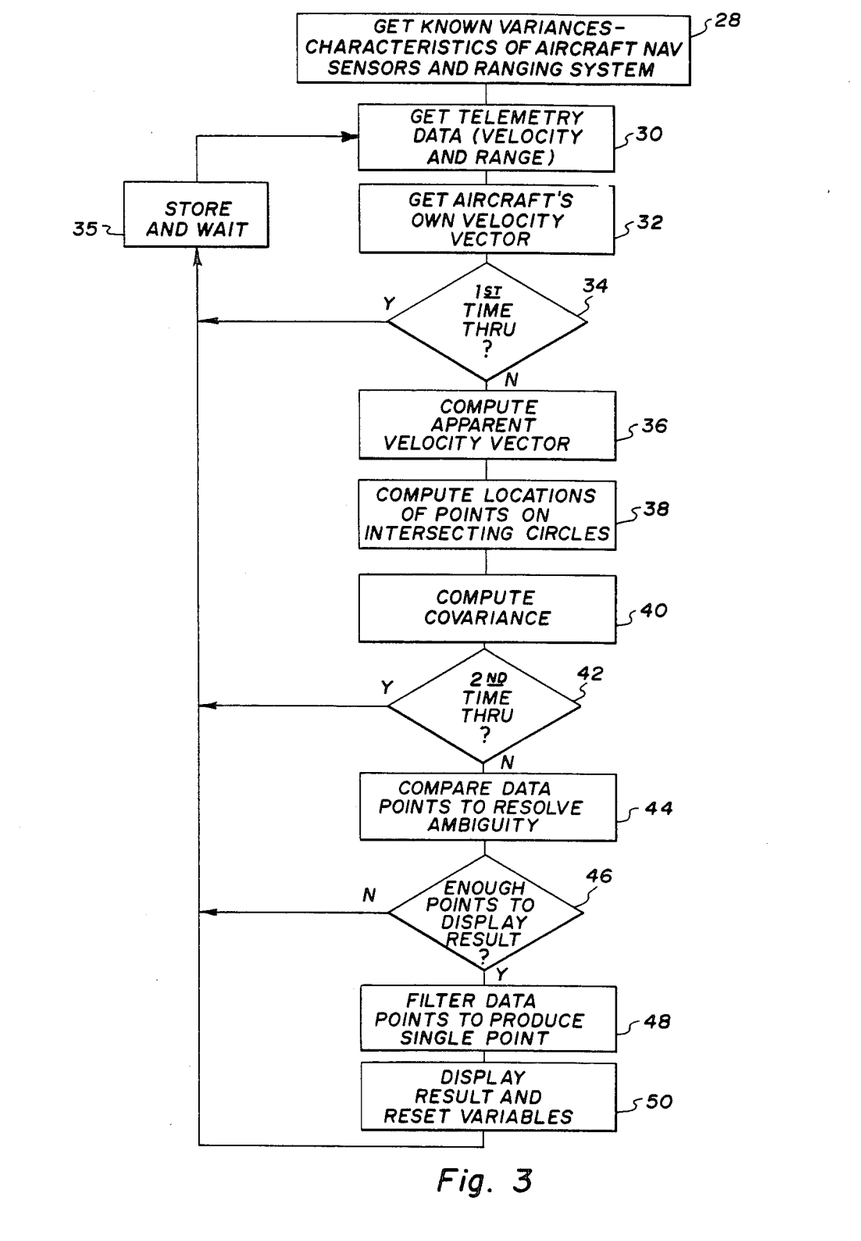
FIG. 3 is a flow diagram of the operation of the invention.

FIG. 3 illustrates the steps involved in the operation of the invention. In step 28, the lead aquires the variances of the wingman's navigation sensors from the wingman. The lead's own variance and the variance of the ranging system are stored with the program in the memory 12 of FIG. 1. In step 30, the lead acquires telemetry data from the wingman via the data link using standard techniques. The telemetry information contains the velocity vector information needed for the computations and the telemetry signal is used to measure the range data. The lead's own velocity vector is acquired in step 32.

If this is the first set of data, i.e., at time $t_0$, then, at step 34, the program branches to step 35 where the data are stored in memory 12 (FIG. 1) for future use. The system then waits a predetermined amount of time, typically on the order of 10 seconds, before acquiring a new set of data from the wingman. This time delay gives the lead and wingman time to change their relative positions enough to provide a meaningful second reading. Also, during this time, information may be obtained from other wingman for use in identical, but separate, calculations.

At step 30, a second set of data are acquired from the wingman and, at step 32, the lead's own velocity vector is again noted. Since this is the second set of data, i.e., time $t_1$, the program passes through step 34 to step 36 where the apparent velocity vector is computed by subtracting the relative velocity vector at $t_0$ from that at $t_1$. The relative velocity vectors are determined by subtracting the absolute velocity vector of the lead from the absolute velocity vector of the wingman.

Next, at step 38, the solutions to equations 1 and 2 above are calculated to produce the two points $(e_1+, n_1+)$ and $e_1-, n_1-)$. The confidence level is then computed at step 40 using the covariance equations.

At step 42, the system branches back to step 30 and again retrieves telemetry data because a minimum of three data points are needed. Consequently, steps 30 through 40 are repeated for time $t_2$ to produce points $(e_2+, n_2+)$ and $(e_2-, n_2-)$.

At step 44, the data points are compared in an attempt to resolve the ambiguous point and determine the true relative location of the wingman. At step 46, the system reviews the covariance values to determine whether the reliability of the data is high enough to display the wingman's relative position. If the covariance is low, the data were reliable and the result can be displayed. If the covariance was high, the data were unreliable and more data points need to be taken. If more data points are taken, steps 30 through 44 are repeated until the reliability is high enough to permit display of the data.

Once the decision to display data is made, the data points are filtered using standard techniques (step 48) to produce a single point. The point is then displayed on the display screen 20 (FIG. 1) at step 50. The pilot is thus given a visual indication of the wingman's relative location.

Although this process has been described with repsect to a single wingman/lead pair, it is apparent that virtually any number of participants could be involved in the process. Each participant will be interrogated especially for its range and velocity vectors and the computations would be done for each participant individually. The results could then be displayed virtually simultaneously on a display screen.

Other modifications to the disclosed invention will be apparent to those skilled in the art. Such modifications may be made without departing from the spirit and scope of the following claims.

We claim:

1. A relative position navigation system installed in a first participant for computing the relative position of at least one other participant, the navigation system comprising:
   communication means for receiving telemetry information from the other participant, including range means for determining the distance between the first participant and any other selected participant at least three selected points in time, $t_0$, $t_1$, $t_2$;
   processor means having a plurality of computational functions;
   a first function of said processor means being to compute the relative velocity vector for the first participant and the other participant for each of times $t_0$, $t_1$ and $t_2$;
   storage means for storing the distances and relative velocity vectors at times, $t_0$, $t_1$ and $t_2$, over which time intervals, defined as $(t_1-t_0)$ and $(t_2-t_1)$, one of the relative velocity vectors represents a change in direction from the other relative velocity vector;
   a second function of said processor means being to compute the azimuth, or, equivalently, the relative position in east-north coordinates, of the other participant relative to the first participant as a function of the distance of the other participant from the first participant at each of the three selected times and of the change in position of the first participant relative to the other selected participant during the time intervals $t_0$ to $t_1$ and $t_1$ and $t_2$; and
   a third function of said processor means being to compute the confidence level for the azimuth as a function of the statistical variances of the range means and the telemetered velocity data.

2. The systems of claim 1 wherein the second function of said processor means further includes solving the following equations to determine possible locations of the other participant at points $(e_n{}^+, n_n{}^+)$ and $(e_n{}^-, n_n{}^-)$ at each times $t_1$ and $t_2$;

$$e_n{}^+ = u^+ \cos \psi + v \sin \psi \quad e_n{}^- = u^- \cos \psi + v \sin \psi$$

$$n_n{}^+ = -u^+ \sin \psi + v \cos \psi \quad n_n{}^- = -u^- \sin \psi + v \cos \psi$$

-continued $$v = \frac{R_0{}^2 - R_1{}^2 - \Delta^2}{2\Delta}$$

$$u^+ = \sqrt{R_1{}^2 - v^2}$$

$$u^- = -\sqrt{R_1{}^2 - v^2}$$

and further includes means for comparing the points $(e_1{}^+, n_1{}^+)$ and $(e_1{}^-, n_1{}^-)$ with the points $(e_2{}^+, n_2{}^+)$ and $(e_2{}^-, n_2{}^-)$ to find two points which coincide and means for displaying the results of the comparison, points $(e_1{}^+, n_1{}^+)$ and $(e_1{}^-, n_1{}^-)$ being the true and false positions of the other participant relative to the first participant at time $t_n$ in an east-north coordinate system, the true position being either the "+" or the "−" solution, depending on the relative geometry of the participants, points $(u_n{}^+, v_n{}^+)$ and $(u_n{}^-, v_n{}^-)$ being the same two positions in the coordinate system defined by the v-axis being rotated by "psi" clockwise from the north, $R_0$ and $R_1$ being the ranges between the first and second participants at times $t_{n-1}$ and $t_n$ respectively, and "delta" being the change in relative position of the two participants over the time interval defined by $t_n - t_{n-1}$.

3. The system of claim 2 wherein the third function of said processor means further includes determining the confidence level for the points $(e_n{}^+, n_n{}^+)$ and $(e_n{}^-, n_n{}^-)$ using the following formulae:

$$cov = \begin{bmatrix} \sigma_{ee}^2 & \sigma_{en}^2 \\ \sigma_{ne}^2 & \sigma_{nn}^2 \end{bmatrix}$$

$$\sigma_{EE}^2 = \frac{\partial E^2}{\partial R0} \sigma_{R0}^2 + \frac{\partial E^2}{\partial R1} \sigma_{R1}^2 + \frac{\partial E^2}{\partial \Delta} \sigma_\Delta^2 + \frac{\partial E^2}{\partial \psi} \sigma_\psi^2$$

$$\sigma_{NN}^2 = \frac{\partial N^2}{\partial R0} \sigma_{R0}^2 + \frac{\partial N^2}{\partial R1} \sigma_{R1}^2 + \frac{\partial N^2}{\partial \Delta} \sigma_\Delta^2 + \frac{\partial N^2}{\partial \psi} \sigma_\psi^2$$

$$\sigma_{EN}^2 = \frac{\partial E}{\partial R0} \frac{\partial N}{\partial R0} \sigma_{R0}^2 + \frac{\partial E}{\partial R1} \frac{\partial N}{\partial R1} \sigma_{R1}^2 +$$

$$\frac{\partial E}{\partial \Delta} \frac{\partial N}{\partial \Delta} \sigma_\Delta^2 + \frac{\partial E}{\partial \psi} \frac{\partial N}{\partial \psi} \sigma_\psi^2$$

$$\sigma_{NE}^2 = \sigma_{EN}^2$$

where: $\sigma_{R\phi}$, $\sigma_{R1}^2$, $\sigma_\Delta^2$, $\sigma_\psi^2$ are variances (standard characteristics) of the measurement errors associated with the ranging system and navigation sensors and include those associated with, and aleady "known" by, the lead apparatus and those associated with, and "known" by, the wingman apparatus, and which are telemetered to the lead apparatus, and wherein the number of selected points in time is a function of the confidence level.

4. A relative position navigation system installed in a first participant for computing and displaying the relative position of at least one other participant in the system comprising:
   range means for determining the distance, $R_n$, between the first participant and the other participant at any preselected point in time, $t_n$;
   velocity means for determining the velocity vector of the first participant at the preselected point in time, $t_n$;

a data link between the first participant for receiving position data, including at least the velocity vector, at the preselected point in time, $t_n$;

processor means having a plurality of computational functions;

a first function of said processor means being to compute the relative velocity vector for the first participant and any other selected participant for the selected point in time, $t_n$;

storage means for storing the range and relative velocity vector for each of at least three points in time, $t_n$, $t_{n+1}$, $t_{n+2}$, the three points in time defining two time intervals therebetween, during which time at least one of the relative velocity vectors represents a change in direction from one of the other relative velocity vectors; and a second function of said processor means being to compute the azimuth, or, equivalently, the relative position in east-north coordinates, of the other selected participant relative to the first participant as a function of the range and relative velocity data for the three selected points in time that define two time intervals, ($t_n$ to $t_{n+1}$) and $t_{n+1}$ to $t_{n+2}$); and a third function of said processor means being to compute the confidence level for the azimuth as a function of the statistical variances of the range means and the telemetered velocity data.

5. The system of claim 4 wherein the computation means determines the azimuth position by computing the point of intersection of three circles, $C_0$, $C_1$, $C_2$, circle $C_0$, having a radius $R_0$ equal to the distance between the first participant and the other selected participant at a selected time $t_n$;

circle $C_1$ having a center translated from the center of circle $C_0$ by an amount equal to the apparent change in integrated velocity between the participants for the time interval ($t_n$ to $t_{n+1}$), and a radius equal to the range between the first participant and the selected other participant at time $t_{n+1}$, and circle $C_2$ having its center translated from the center of circle $C_1$ by an amount equal to the apparent change in integrated velocity between the participants during the time interval ($t_{n+1}$ to $t_{n+2}$), and a radius $R_2$ equal to the distance between the first participant and the other participant at time $t_{n+2}$.

6. The system of claim 4 wherein the second function of said processor means further includes solving the following equations to determine possible locations of the other participants at points ($e_n^{30}$, $n_n^+$) and ($e_n^-$, $n_n^-$) at each time $t_n$:

$$e_n^+ = u^+ \cos \psi + v \sin \psi \quad e_n^- = u^- \cos \psi + v \sin \psi$$

$$n_n^+ = -u^+ \sin \psi + v \cos \psi \quad n_n^- = -u^- \sin \psi + v \cos \psi$$

$$v = \frac{R_0^2 - R_1^2 - \Delta^2}{2\Delta}$$

$$u^+ = \sqrt{R_1^2 - v^2}$$

$$u^- = -\sqrt{R_1^2 - v^2}$$

and further includes means for comparing the points ($e_n^+$, $n_n^+$) and ($e_n^-$, $n_n^-$) at each point in time to find two points which coincide, points ($e_1^+$, $n_1^+$) and ($e_1^-$, $n_1^-$) being the true and false positions of the other participant relative to the first participant at time $t_n$ in an east-north coordinate system, the true position being either the "+" or the "−" solution, depending on the relative geometry of the participants, points ($u_n^+$, $v_n^+$) and $u_n^-$, $v_n^-$) being the same two positions in the coordinate system defined by the v-axis being rotated by "psi" clockwise from the north, $R_0$ and $R_1$ being the ranges between the first and second participants at times $t_{n-1}$ and $t_n$ respectively, and "delta" being the change in relative position of the two participants over the time interval defined by $t_n - t_{n-1}$.

7. The system of claim 6 wherein the third function of said processor means further includes means for determining the confidence level for the points ($e_n^+$, $n_n^+$) and ($e_n^-$, $n_n^-$) using the following formulae:

$$cov = \begin{bmatrix} \sigma_{ee}^2 & \sigma_{en}^2 \\ \sigma_{ne}^2 & \sigma_{nn}^2 \end{bmatrix}$$

$$\sigma_{EE}^2 = \frac{\partial E^2}{\partial R0} \sigma_{R0}^2 + \frac{\partial E^2}{\partial R1} \sigma_{R1}^2 + \frac{\partial E^2}{\partial \Delta} \sigma_\Delta^2 + \frac{\partial E^2}{\partial \psi} \sigma_\psi^2$$

$$\sigma_{NN}^2 = \frac{\partial N^2}{\partial R0} \sigma_{R0}^2 + \frac{\partial N^2}{\partial R1} \sigma_{R1}^2 + \frac{\partial N^2}{\partial \Delta} \sigma_\Delta^2 + \frac{\partial N^2}{\partial \psi} \sigma_\psi^2$$

$$\sigma_{EN}^2 = \frac{\partial E}{\partial R0} \frac{\partial N}{\partial R0} \sigma_{R0}^2 + \frac{\partial E}{\partial R1} \frac{\partial N}{\partial R1} \sigma_{R1}^2 +$$

$$\frac{\partial E}{\partial \Delta} \frac{\partial N}{\partial \Delta} \sigma_\Delta^2 + \frac{\partial E}{\partial \psi} \frac{\partial N}{\partial \psi} \sigma_\psi^2$$

$$\sigma_{NE}^2 = \sigma_{EN}^2$$

where: $\sigma_{R\phi}^2$, $\sigma_{R1}^2$, $\sigma_\Delta^2$, $\sigma_\psi^2$ are variances of the measurement errors associated with the ranging system and navigation sensors and include those associated with, and already "known" by, the lead apparatus and those associated with, and "known" by, the wingman apparatus, and which are telemetered to the lead apparatus, and wherein the number of selected points in time is a function of the confidence level.

8. A method of finding the relative position between a first participant and at least one other participant at a selected point in time comprising the steps:

(a) deterining the range between the first participant and the other participant and receiving the velocity vector of the other participant from the other participant at each of at least three points in time, $t_0$, $t_1$, $t_2$, that define two time intervals, ($t_0$ to $t_1$) and ($t_1$ tp $t_2$), during at least one of which intervals the direction of motion of the first participant relative to the other participant changes;

(b) determining the change in position of the first participant relative to the other selected participant for time intervals ($t_0$ to $t_1$) and ($t_1$ to $t_2$);

(c) computing the non-ambiguous solution for the azimuth coordinate at time $t_2$ a a function of the range between the first and other participant for each of the three selected points in time, $t_0$, $t_1$, $t_2$ and the change in position of the first participant relative to the other participant during each of the time intervals ($t_0$ to $t_1$) and ($t_1$ and $t_2$); and (d) computing the confidence level for the azimuth as a function of the statistical variances of the range-determining system and the velocity vector data.

9. The method of claim 8 wherein the computation of step (c) is performed by defining the point of interaction of three circles, ($C_0$, $C_1$, $C_2$), circle $C_0$ having a radius $R_0$ equal to the distance between the first participant and the other selected participant at time $t_0$;

circle $C_1$ having a center translated from the center of circle $C_0$ by an amount equal to the apparent change in integrated velocity between the participants for the time interval ($t_n$ to $t_1$), and a radius $R_1$ equal to the range between the first participant and the other participant at time $t_1$, and circle $C_2$ having its center translated from the center of circle $C_1$ by an amount equal to the apparent change in integrated velocity between the participants during the time interval ($t_1$ to $t_2$), and a radius $R_2$ equal to the distance between the first participant and the other participant at time $t_2$.

10. The method of claim 8 wherein the calculation of step (c) solves the following equations to determine possible locations of the other participant at points ($e_n^+$, $n_n^+$) and ($e_n^-$, $n_n^-$) at each of times $t_1$ and $t_2$:

$$e_n^+ = u^+ \cos \psi + v \sin \psi \quad e_n^- = u^- \cos \psi + v \sin \psi$$

$$n_n^+ = -u^+ \sin \psi + v \cos \psi \quad n_n^- = -u^- \sin \psi + v \cos \psi$$

$$v = \frac{R_0^2 - R_1^2 - \Delta^2}{2\Delta}$$

$$u^+ = \sqrt{R_1^2 - v^2}$$

$$u^- = -\sqrt{R_1^2 - v^2}$$

and compares the points ($e_2^+$, $n_2^+$) and ($e_2^-$, $n_2^-$) to find two points which coincide, points ($e_1^+$, $n_1^+$) and ($e_1^-$, $n_n^-$) being the true and false positions of the other participant relative to the first participant at time $t_n$ in an east-north coordinate system, the true position being either the "+" or the "−" solution, depending on the relative geometry of the participants, points ($u_n^+$, $v_n^+$) and ($u_n^-$, $v_n^-$) being the same two positions in the coordinate system defined by the v-axis being rotated by "psi" clockwise from the north. $R_0$ and $R_1$ being the ranges between the first and second participants at times $t_{n-1}$ and $t_n$ respectively, and "delta" being the change in relative position of the two participants over the time interval defined by $t_n - t_{n-1}$.

11. The method of claim 10 wherein the confidence level for the points ($e_1^+$; $n_1^+$) and ($e_n^-$, $n_1^-$) is determined using the following formulae:

$$cov = \begin{bmatrix} \sigma_{ee}^2 & \sigma_{en}^2 \\ \sigma_{ne}^2 & \sigma_{nn}^2 \end{bmatrix}$$

$$\sigma_{EE}^2 = \frac{\partial E^2}{\partial R0} \sigma_{R0}^2 + \frac{\partial E^2}{\partial R1} \sigma_{R1}^2 + \frac{\partial E^2}{\partial \Delta} \sigma_\Delta^2 + \frac{\partial E^2}{\partial \psi} \sigma_\psi^2$$

$$\sigma_{NN}^2 = \frac{\partial N^2}{\partial R0} \sigma_{R0}^2 + \frac{\partial N^2}{\partial R1} \sigma_{R1}^2 + \frac{\partial N^2}{\partial \Delta} \sigma_\Delta^2 + \frac{\partial N^2}{\partial \psi} \sigma_\psi^2$$

$$\sigma_{EN}^2 = \frac{\partial E}{\partial R0} \frac{\partial N}{\partial R0} \sigma_{R0}^2 + \frac{\partial E}{\partial R1} \frac{\partial N}{\partial R1} \sigma_{R1}^2 +$$

$$\frac{\partial E}{\partial \Delta} \frac{\partial N}{\partial \Delta} \sigma_\Delta^2 + \frac{\partial E}{\partial \psi} \frac{\partial N}{\partial \psi} \sigma_\psi^2$$

$$\sigma_{NE}^2 = \sigma_{EN}^2$$

where: $\sigma_{R\phi}^2$, $\sigma_{R1}^2$, $\sigma_\Delta^2$, $\sigma_\psi^2$ are variances (standard statistical characteristics) of the measurement errors associated with the ranging system and navigation sensors and include those associated with, and already "known" by, the lead apparatus and those associated with, and "known" by, the wingman apparatus, and which are telemetered to the lead apparatus, and wherein the number of selected points in time is a function of the confidence level.

* * * * *

UNITED STATES PATENT AND TRADEMARK OFFICE
CERTIFICATE OF CORRECTION

PATENT NO. : 4,814,994
DATED : March 21, 1989
INVENTOR(S) : James R. Doane et al It is certified that error appears in the above-identified patent and that said Letters Patent is hereby corrected as shown below:

Column 4, line 47, "$(e_1-, c_1-)$ and $(e_1+, n_1+)$" should be --$(e_1^-, n_1^-)$ and $(e_1^+, n_1^+)$--;

Column 4, line 60, "$(e_2+, n_2+)$ and $e_2-, n_2-)$" should be --$(e_2^+, n_2^+)$ and $(e_2^-, n_2^-)$--;

Column 5, lines 3 and 4, "$(e_n+, n_n+)$ and $(e_n-, n_n-)$" should be --$(e_n^+, n_n^+)$ and $(e_n^-, n_n^-)$--;

Column 5, line 5, "$\tan^{--}$" should be --$\tan^{-1}$--;

Column 5, line 7, "$(e+, n+)$ and $(e-, n-)$" should be --$(e^+, n^+)$ and $(e^-, n^-)$--;

Column 5, line 8, "formule" should be --formulae:--;

Column 5, line 10, "$\nu \sin \psi$" should be --$v\sin\psi$--;

Column 5, line 12, "$ee^-n$" should be --$e^-_n$--;

Column 5, line 12, "$\nu \sin \psi$" should be --$v\sin\psi$--;

Column 5, line 14, "$\nu \cos \psi$" should be --$v\cos\psi$--;

Column 5, line 16, "N" should be --n--;

UNITED STATES PATENT AND TRADEMARK OFFICE
CERTIFICATE OF CORRECTION

PATENT NO. : 4,814,994

DATED : March 21, 1989

INVENTOR(S) : James R. Doane et al

It is certified that error appears in the above-identified patent and that said Letters Patent is hereby corrected as shown below:

Column 5, line 16, "$\nu\cos\psi$" should be --$v\cos\psi$--;

Column 5, line 16, "$-h^-$" should be -- $-u^-$ --;

Column 5, line 22, "u+, u-" should be --$u^+$, $u^-$--;

Column 5, line 27, "$\nu$=" should be --v=--;

Column 5, line 30, "$\nu^2$" should be --$v^2$--;

Column 5, line 33, "$\nu^2$" should be --$v^2$--;

Column 5, line 40, "$u_n^-$, $v_n^-$) should be --$(u_n^-, v_n^-)$--;

Column 6, line 14, "$\sigma R\phi^2$, $\sigma R1^2$, $\sigma\Delta^2$, $\sigma_\psi^2$," should be --$\sigma_{RO}^2, \sigma_{R1}^2, \sigma_\Delta^2, \sigma_\psi^2$--;

Column 6, lines 55, 56, "($e_1$+,n1+) and $e_1$-, $n_1$-)" should be

"$(e_1^+, n_1^+)$ and $(e_1^-, n_1^-)$--;

Column 6, line 62, "(e2+,n2+) and (e2-, n2-)" should be

--$(e_2^+, n_2^+)$ and $(e_2^-, n_2^-)$;

Column 7, line 66, "$v\sin\psi$" should be --$v\sin\psi$--in both formulas;

Column 7, line 67, "$v\cos\psi$" should be --$v\cos\psi$--in both formulas;

UNITED STATES PATENT AND TRADEMARK OFFICE
CERTIFICATE OF CORRECTION

PATENT NO. : 4,814,994
DATED : March 21, 1989
INVENTOR(S) : James R. Doane et al It is certified that error appears in the above-identified patent and that said Letters Patent is hereby corrected as shown below:

Column 8, line 3, "$v=$" should be --$v=$--;

Column 8, line 6, "$v^2$" should be --$v^2$--.

Column 8, line 8, "$v^2$" should be --$v^2$--.

Column 8, line 49, "$\sigma R_\phi, \sigma R1^2, \sigma\Delta^2, \sigma_\psi^2$" should be
-- $\sigma_{R0}^2, \sigma_{R1'}^2, \sigma_\Delta^2, \sigma_\psi^2$ --;

Column 9, line 28, delete "computation" and add --second function of said processor--;

Column 9, line 49, "$(e_n^{30}, n_n^+)$" should be --$(e_n^+, n_n^+)$--;

Column 9, line 52, "$v\sin\psi$" should be --$v\sin\psi$-- in both formulas;

Column 9, line 54, "$v\cos\psi$" should be --$v\cos\psi$-- in both formulas--;

Column 9, line 56, "$v=$" should be --$v=$--;

Column 9, line 58, "$v^2$" should be --$v^2$--;

Column 9, line 60, "$v^2$" should be --$v^2$--;

Column 10, line 3, "$u_n-, v_n-$)" should be --$(u_n^-, v_n^-)$--;

UNITED STATES PATENT AND TRADEMARK OFFICE
CERTIFICATE OF CORRECTION

PATENT NO. : 4,814,994                    Page 4 of 4

DATED      : March 21, 1989

INVENTOR(S) : James R. Doane et al

It is certified that error appears in the above-identified patent and that said Letters Patent is hereby corrected as shown below:

Column 10, line 33, "$\sigma R\phi^2, \sigma R1^2, \sigma\Delta^2, \sigma_\psi^2$" should be -- $\sigma_{RO}^2, \sigma_{R1}^2, \sigma_\Delta^2, \sigma_\psi^2$ --;

Column 11, line 20, " $\nu \sin\psi$ " should be --$v \sin\psi$-- in both formulas;

Column 11, line 22, "$\nu \cos\psi$" should be --$v \cos\psi$-- in both formulas;

Column 12, line 8, "$(e_1^+; n_1^+)$ and $(e_n^-, n_1^-)$" should be -- $(e_n^+, n_n^+)$ and $(e_n^-, n_n^-)$ --;

Column 12, line 29, "$\sigma R_\phi^2, \sigma R1^2, \sigma\Delta^2, \sigma_\psi^2$" should be -- $\sigma_{RO}^2, \sigma_{R1}^2, \sigma\Delta^2, \sigma_\psi^2$ --.

Signed and Sealed this

Twenty-sixth Day of February, 1991

Attest:

HARRY F. MANBECK, JR.

*Attesting Officer*          *Commissioner of Patents and Trademarks*